United States Patent
Richardson et al.

(10) Patent No.: US 6,302,297 B1
(45) Date of Patent: Oct. 16, 2001

(54) EXTERNAL METERING VALVE FOR A FUEL CELL

(75) Inventors: William E. Richardson, Meadows; Valery G. Vanstaan, Highland Park; Mohamed K. Wagdy, Arlington Heights; Sandra J. Wilson, Hawthorn Woods, all of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/655,946

(22) Filed: Sep. 6, 2000

(51) Int. Cl.$^7$ ....................................................... B67B 5/00
(52) U.S. Cl. ...................... 222/1; 222/402.2; 222/402.14
(58) Field of Search ........................ 222/153.11, 402.11, 222/402.13, 402.14, 402.24, 402.2, 1

(56) References Cited

U.S. PATENT DOCUMENTS

| | | | |
|---|---|---|---|
| 4,403,722 | 9/1983 | Nikolich | ................................... 227/8 |
| 4,440,325 | * 4/1984 | Treuhaft et al. | ................. 222/402.14 |
| 4,483,474 | * 11/1984 | Nikolich | ................................... 227/8 |
| 4,522,162 | 6/1985 | Nikolich | .............................. 123/46.5 |
| 5,115,944 | 5/1992 | Nikolich | ................................. 222/94 |

* cited by examiner

Primary Examiner—Kevin Shaver
Assistant Examiner—Patrick Buechner
(74) Attorney, Agent, or Firm—Lisa M. Soltis; Mark W. Croll; Donald J. Brah

(57) ABSTRACT

A valve configured for use with a fuel cell in both a disengaged position, in which the valve has not established fluid communication with the fuel cell, and an engaged position, in which the valve has established fluid communication with the fuel cell. The valve includes a body having a first formation for maintaining the disengaged position, and a second formation for maintaining the engaged position.

19 Claims, 3 Drawing Sheets

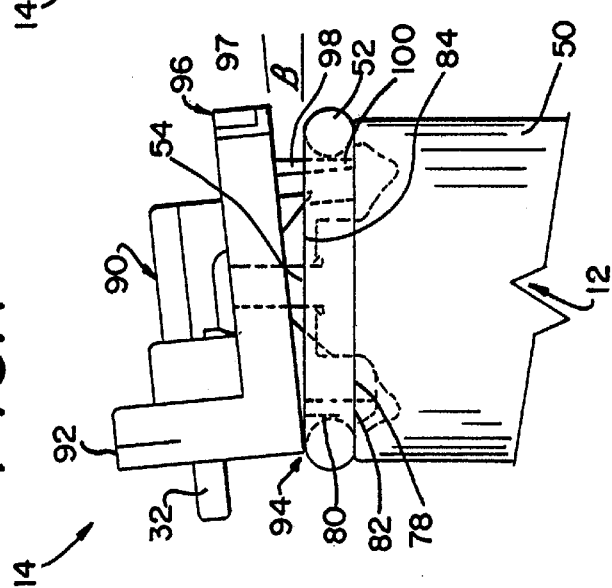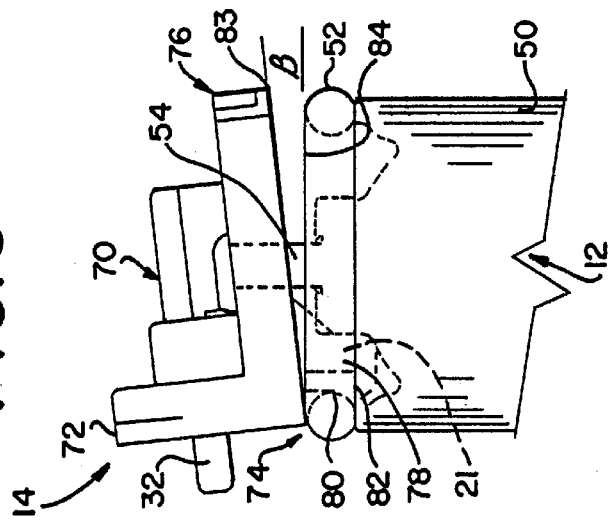

EXTERNAL METERING VALVE FOR A FUEL CELL

BACKGROUND OF THE INVENTION

This invention relates to improvements in an external metering valve for use with a fuel cell, aerosol can, or dispenser for dispensable fluid.

As exemplified in Nikolich U.S. Pat. Nos. 4,403,722, 4,483,474, 4,522, 162, and 5,115,944, all of which are incorporated by reference, it is known to use a dispenser for a dispensable fluid to dispense a hydrocarbon fuel to a combustion gas-powered tool, such as, for example, a combustion gas-powered fastener-driving tool. Such fastener-driving tools and such fuel cells are available commercially from ITW-Paslode (a division of Illinois Tool Works, Inc.) of Vernon Hills, Ill., under its IMPULSE trademark. In particular, a suitable fuel cell is described in Nikolich U.S. Pat. No. 5,115,944, listed above.

Two systems are known for attaching an external valve to a fuel cell of this type. In the first known system, the valve is fully engaged with the fuel cell (See FIG. 1). In the second known system, the valve is positioned in a holding or shipping cap on the top of the fuel cell in a disengaged position (See FIG. 2). To place the fuel cell in operation, the user must remove the shipping cap and depress the valve into the engaged position depicted in FIG. 1.

The first system is known to be "friendly" to the user, since it is completely ready for use. However, at the same time, this system exposes the valve to the contained fuel for the whole life of the unit, from the moment it is manufactured until the fuel is completely used up. This shortens the useful life of the fuel cell due to product leaks, not only from the internal seals in the fuel cell, but also through seals located in the valve.

A significant drawback of the second system is not additional leaks, but its complexity to the user. The user must be warned to remove the shipping cap and properly install the valve in a two-step process, otherwise the system will not work or may expel some product from the fuel cell. Also, trying to install the fuel cell with the shipping cap still in place can cause extensive damage to the tool.

Accordingly, one object of the present invention is to provide an improved external valve for a fuel cell that can be engaged with the fuel cell in a shipping position without the need for a shipping cap so that unwanted fuel emission is prevented.

Another object of the present invention is to provide an improved external valve for a fuel cell that is readily moved from the shipping position to an operational position in which the valve is in fluid communication with the fuel cell.

Yet another object of the present invention is to provide an improved external valve for a fuel cell which has a shipping position and is placed in an operational position upon installation in the tool.

BRIEF SUMMARY OF THE INVENTION

The above-listed objects are met or exceeded by the present external metering valve for a fuel cell which features a valve that is mounted to the fuel cell in a shipping position without the assistance of a shipping cap, and is then easily shifted to an operational position. In one embodiment of the present invention, the valve has two legs shaped to allow the valve to be positioned in either a shipping position or an operational position. To use the valve of this embodiment, a user manually presses down on the valve to move it from the shipping to the operational position. Once the present valve is operationally engaged on the fuel cell, the fuel cell may be installed into the gas-powered combustion tool in a conventional manner.

This simplifies the engaging process and makes the valve user friendly. Another advantage of this embodiment is that the valve is not exposed to the effects of the fuel inside the fuel cell while in the shipping position, which results in a longer useful life for the fuel cell. Still another advantage of this embodiment is that the shape of the legs on the valve body secures it on the fuel cell during shipping and/or storage, which eliminates the need for a shipping cap.

According to other embodiments of the present invention, the valve body consists of one or two legs, shaped in a way to meet a crimped cup curvature of the fuel cell, and to allow the engagement of the valve directly inside the tool. The front (in a two-legged body) or the only leg is inserted under the rim of the fuel cell, while the valve is partially engaged with the fuel cell stem. In this attachment, the valve does not open or keep the fuel cell open, and does not expose the valve to the effects of the fuel, which results in a longer life for the fuel cell. The valve becomes functional only when it becomes fully engaged with the fuel cell, by such means as a locking/actuating device on the tool in which it is being used.

This provides the advantage of being simple to use, because no additional action is needed to engage the valve with the fuel cell. Yet another advantage of eliminating a shipping cap for holding the valve in the shipping position, is that it eliminates the mistake of attaching the valve incorrectly to the fuel cell, or forgetting to remove the cap prior to installation in the tool.

More specifically, the present invention provides a valve configured for use with a fuel cell in both a disengaged (or shipping) position, in which the valve has not established fluid communication with the fuel cell, and an engaged (or operational) position, in which the valve has established fluid communication with the fuel cell. The valve contains a body with a first formation for maintaining the disengaged position, and a second formation for maintaining the engaged position.

In one embodiment, the valve body has at least one leg with two formations defined thereon. The first formation, which is disposed below the second formation, is a groove configured for holding the valve body in the disengaged position. The second formation is a second groove configured for holding the valve body in the engaged position.

According to another embodiment, the valve body has at least one leg attached to the front end of the valve body, and the leg is configured to be frictionally secured to a rolled seam of the fuel cell in the disengaged position. In the disengaged position, the back end of the valve body is raised above the fuel cell, so that the body defines an angle relative to a plane defined by an upper end of the fuel cell. Upon installation in the tool, the valve is placed in the engaged position.

BRIEF DESCRIPTION OF THE SEVERAL VIEWS OF THE DRAWINGS

FIG. 6 is an elevational, fragmentary view of a second embodiment of the present valve shown engaged with a fuel cell in the shipping position;

FIG. 7 is an elevational, fragmentary view of a third embodiment of the present valve shown engaged with a fuel cell in the shipping position; and FIG. 8 is an elevational, fragmentary view of a fourth embodiment of the present valve shown engaged with a fuel cell in the shipping position.

DETAILED DESCRIPTION OF THE INVENTION

Figure 1:
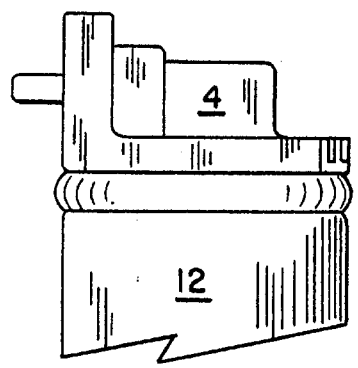
FIG. 1 is a fragmentary elevational view of a prior art fuel cell, showing a valve in the engaged position.
Figure 2:
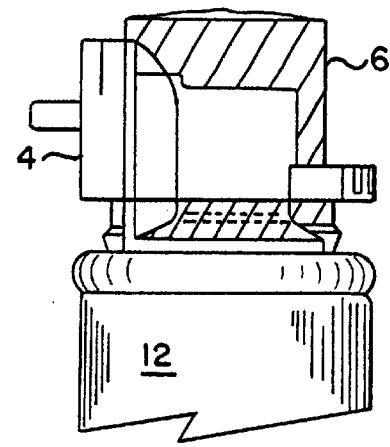
FIG. 2 is a fragmentary elevational view of another prior art fuel cell, showing a valve being held in the shipping position by a shipping cap.

Referring now to FIGS. 1 and 2, a prior art valve 4 is seen being held above a fuel cell 12 in a disengaged position by a holding or shipping cap 6. As known in the prior art, to move from the disengaged position to the engaged position as seen in FIG. 1, a user must first remove the holding cap 6 together with the prior art valve 4 (at this time the two are connected by a snap fit). Then, the user needs to disconnect the holding cap 6 from the prior art valve 4, and next place the prior art valve 4 onto the fuel cell 12, snapping it into the engaged position. The engaged position can be seen in FIG. 1, which depicts the prior art valve 4 engaged with the fuel cell 12.

Also known in the prior art is shipping the fuel cell 12 with the prior art valve 4 fully engaged, as seen in FIG. 1. Because the prior art valve 4 is filly engaged with the fuel cell 12, the prior art valve is exposed to the fluid contained in the fuel cell, and the useful life of the fuel cell is shortened.

The present invention eliminates the problems of the prior art, by providing a valve that protects the fuel cell 12 and its useful life, without engaging in fluid communication, and having a simple one step that moves the valve from the disengaged position to the engaged position.

Figure 3:
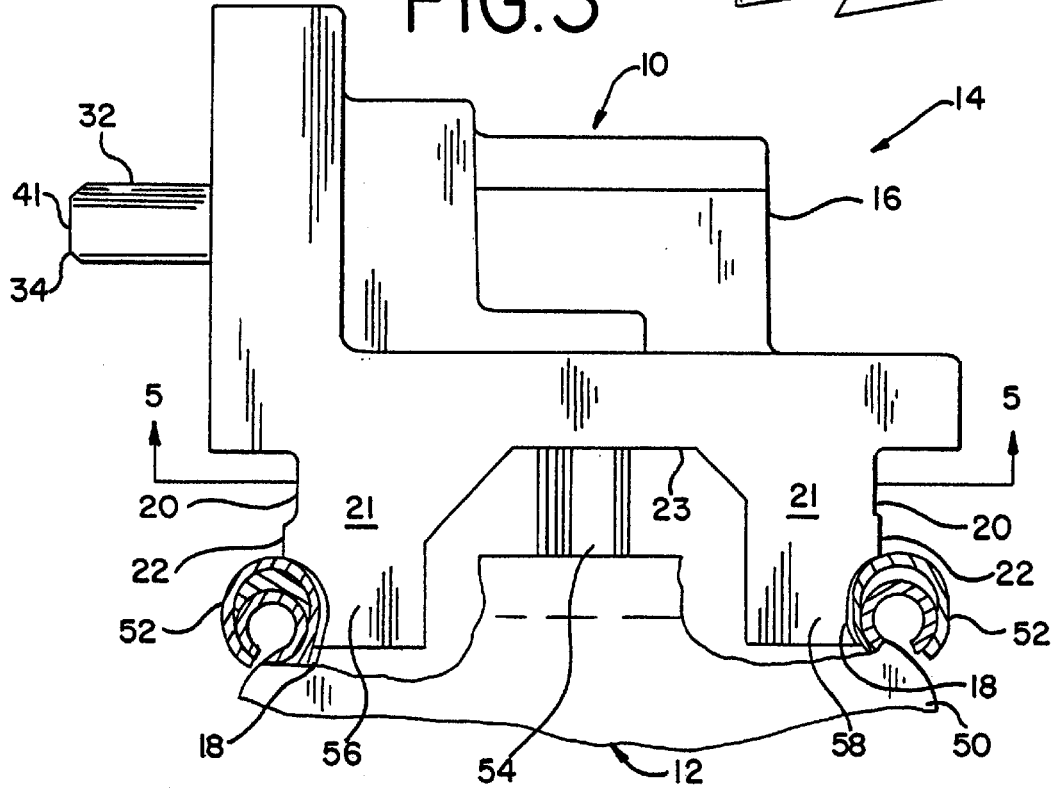
FIG. 3 is an elevational view of the preferred embodiment of the present valve shown engaged with a fuel cell in the shipping position, the fuel cell shown partially for clarity.

Referring now to FIG. 3, an external metering valve, generally designated 10, is provided for use with the fuel cell 12, and is depicted in the shipping position. A valve/fuel cell unit, generally designated 14, and including the valve 10 and the fuel cell 12, may be advantageously employed in a combustion gas-powered fastener-driving tool, such as, for example, those exemplified in the Nikolich patents noted above, and which are incorporated by reference.

Broadly, the valve 10 is configured for use with the fuel cell 12 in both a disengaged (or shipping) position (best seen in FIG. 3), in which the valve 10 has not established fluid communication with the fuel cell 12, and an engaged (or operational) position (best seen in FIG. 4), in which the valve 10 has established fluid communication with the fuel cell 12. In the preferred embodiment, the valve 10 includes a valve body 16 having a first formation 18 for maintaining the disengaged position, and a second formation 20 for maintaining the engaged position.

More specifically, the valve body 16 has at least one leg 21 having both the first formation 18, preferably a shipping groove (or notch) configured for holding the valve body 16 in the disengaged position, and the second formation 20, an operational groove (or notch) configured for holding the valve body 16 in the engaged position. Further, in the preferred embodiment, the first formation 18 is disposed below the second formation 20, with a band 22 separating the formations 18, 20.

Figure 5:
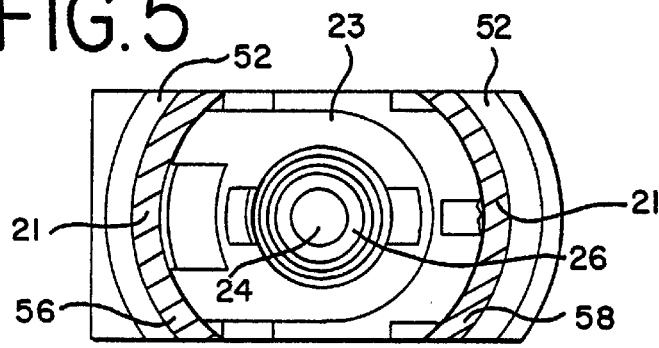
FIG. 5 is a sectional view taken along the line 5—5 of FIG. 3, in the direction generally indicated.
Figure 4:
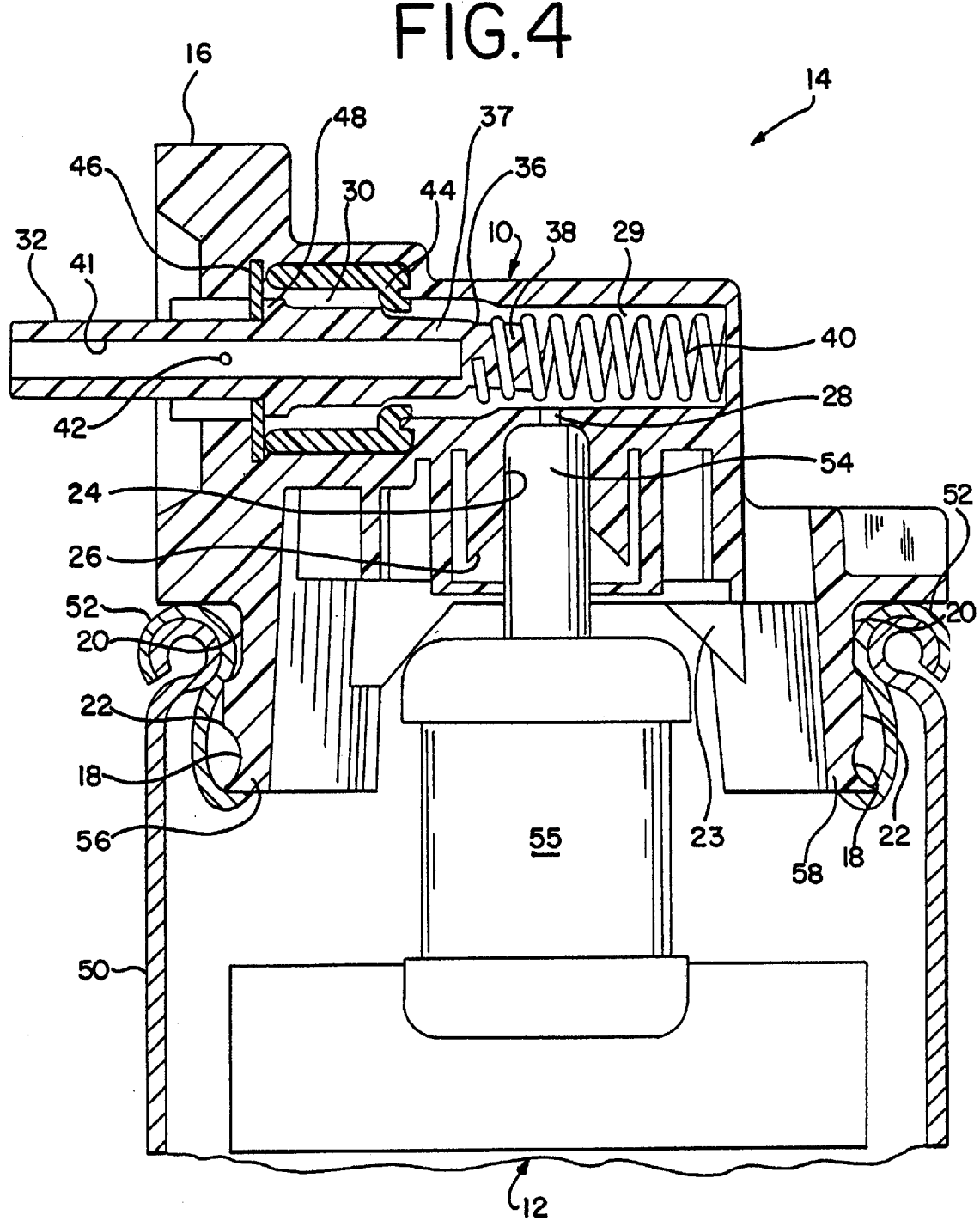
FIG. 4 is a vertical cross-sectional view of the preferred embodiment of the present valve shown engaged with a fuel cell in the operational position.

Referring now to FIGS. 4 and 5, located on an under side 23 of the valve 10, is a generally circular intake port 24, which is defined by a tapered wall 26. An intake orifice 28 is defined above, and is in fluid communication with, the intake port 24, and leads into a body chamber 29. In fluid communication with the body chamber 29 is a metering chamber 30. The valve 10 also contains a valve stem 32 which extends out of the valve body 16 and has an outlet end 34 and a biased end 36. On the biased end 36, a locating lug 38 is found on a necked down portion of the valve stem 32, where a spring 40 disposed in the body chamber 29 engages the valve stem. Also on the valve stem 32 is a passageway 41 extending from the locating lug 38 to the outlet end 34, and a valve stem orifice 42 in fluid communication with the passageway.

There is a lip seal 44 inside the metering chamber 30 which allows fuel to travel from the body chamber 29 to the metering chamber. There is also an outlet seal 46 located inside the valve body 16 which prevents leakage of any fuel contained in the metering chamber 30. The valve stem 32 further has a radial stop 48 formed thereon, which abuts the outlet seal 46. The valve stem 32 has two areas with a smaller 37 and larger diameters. The clearance between the smaller diameter 37 and lip seal 44 allows fuel to flow between the body chamber 29 and the metering chamber 30 as long as the valve stem is in the position shown in FIG. 4.

The fuel cell 12 includes a cylindrical shell 50 with a rolled seam 52 at the top end, which defines a circular space circumscribing a nozzle or fuel cell stem 54. As seen in FIG. 4, the fuel cell 12 also includes a tubular valve 55, which is connected to the fuel cell stem 54. When the valve 10 is engaged upon the fuel cell 12, the fuel cell stem 54 is matingly engaged into the intake port 24, which engagement is facilitated by the wall 26. Upon engagement, the fuel cell stem 54 is depressed, permitting the fuel inside the fuel cell 12 to escape out of the fuel cell stem, through the intake orifice 28, and into the body chamber 29. From the body chamber 29, the fuel flows between the lip seal 44 and the valve stem 32 to fill the metering chamber 30. Once the valve/fuel cell unit 14 is operationally engaged inside a combustion tool, the valve stem 32 is forced inward or to the right as shown in FIG. 4, compressing the spring 40 far enough so that the valve stem orifice 42 is moved into the metering chamber 30.

As the valve stem 32 is forced into the valve body 16, the increasing diameter of the valve stem 32 pushes against the lip seal 44, preventing any more fuel from entering the metering chamber 30 from the body chamber 29. As the metering chamber 30 is sealed off, the fuel in the metering chamber travels through the valve stem orifice 42, into and through the valve stem 32, and finally into the combustion tool. After the fuel from the metering chamber 30 is released into the combustion tool, a fastener driving combustion event follows. The tool is constructed and arranged so that the axial force exerted on the valve stem 32 is released, and the spring 40 forces the valve stem toward the outlet end 34 until the radial stop 48 again abuts the outlet seal 46. As the valve stem 32 is pushed back into its biased position (FIG. 4), the lesser diameter of the valve stem near the biased end 36 allows fuel to again pass between the lip seal 44 and the valve stem, into the metering chamber 30.

Now referring to FIGS. 3–5, in the preferred embodiment, the legs 21 include both a front leg 56 and a back leg 58. Both the front leg 56 and back leg 58 have the shipping groove 18 and the operational groove 20 defined thereon, and both legs are arcuate in cross-section when viewed from below. The legs 21 are dimensioned to tightly engage the rolled seam 52 in a snap fit. It is contemplated that the number and configuration of the legs 21 may vary to suit the application.

It is preferred that the front leg 56 have a larger cross-section relative to the back leg 58, as shown in FIGS. 3 and 5. The reason is that there are stronger forces that act upon the front leg 56 than the back leg 58 when the valve 10 is installed on the fuel cell 12, and once the valve/fuel cell unit 14 is placed into a combustion tool. However, it would be possible as necessary, to have the same cross-section for both legs, or even the back leg 58 having a larger cross-section relative to the front leg 56.

In FIG. 3, the preferred embodiment is shown in the disengaged or shipping/storage position. The valve 10 is placed on the fuel cell 12, with the fuel cell stem 54 aligned with the intake port 24. Then, the front and back legs 56, 58 are pushed downward onto the fuel cell 12 so that the shipping groove 18 of each leg is engaged with the rolled seam 52, and the band 22 on each leg is positioned just above the rolled seam 52. This formation holds the valve 10 in place on the fuel cell 12 without establishing fluid communication. In this disengaged position, the fuel cell stem 54 is protected by the valve 10, and since the fuel cell 12 is not functional at this point, exposure of the fuel to the valve 10 is eliminated, and leaks from the fuel cell 12 are minimized.

To move from the disengaged position of FIG. 3, to the engaged position of FIG. 4, the user only needs to push the valve 10 downward on the fuel cell 12, so that the operational groove 20 on both the front leg 56 and the back leg 58 are engaged with the rolled seam 52, and the band 22 on each leg is positioned just below the rolled seam 52. In this engaged position, the valve 10 establishes fluid communication with the fuel cell 12, and the valve/fuel cell unit 14 is ready to be placed inside a combustion tool. The present invention simplifies the engaging process, making the valve 10 easier to use. Also, the present invention eliminates the need for additional assembling, attaching, or rearranging the valve and contending with the overcap 6 as would have been required with the prior art system depicted in FIG. 2.

In a second embodiment of the present invention as seen in FIG. 6, a valve, generally designated 70, is configured for use with a fuel cell 12 in both a disengaged position, in which the valve has not established fluid communication with the fuel cell, and an engaged position, in which the valve has established fluid communication with the fuel cell. The valve 70 includes a valve body 72 having a front end 74 and a back end 76, where the front end has at least one leg 21 (shown hidden) that is configured to be frictionally secured to the rolled seam 52 of the fuel cell 12 in the disengaged position. It is preferred in this second embodiment that the front end 74 have a single front leg 78 with a groove 80 defined above a lip 82, which is found at the bottom of the front leg. When this second embodiment is in the disengaged position, the back end 76 of valve body 72 is raised above the fuel cell 12, so that a lower edge 83 of the valve body defines an angle β relative to a plane defined by an upper end 84 of the fuel cell.

In operation, to place the valve 70 of FIG. 6 in the disengaged position, the fuel cell stem 54 is lined up with the intake port 24, and the front leg 78 is inserted so that the groove 80 is frictionally fitted onto the rolled seam 52, with the lip 82 positioned under the rolled seam. In this embodiment, no other step is needed to place the valve 70 into the engaged position other than placing the valve/fuel cell unit 14 in the tool. The back end 76, normally held in an elevated position relative to the fuel cell 12, is forced down against the upper end 84 of the fuel cell 12, by a door on the tool, which places the valve 70 in the engaged position, establishing fluid communication between the fuel cell and the valve 70. When the valve body 72 is pushed into the engaged position by the combustion tool door, the valve stem 32, which is normally biased to a closed position, is movable by the combustion tool. To inject fuel into the combustion chamber of the tool, the door on the combustion tool pushes the valve stem 32 inward to an open position which allows fluid communication between the valve 70 and the tool.

In a third embodiment of the present invention as seen in FIG. 7, a valve, generally designated 90 is similar to the valve 70 of the second embodiment in FIG. 6, except that, in addition to the front leg 78, the valve 90 has a valve body 92 with a front end 94 and a back end 96, where the back end has a back leg 98 with a tooth or protrusion 100 formed at the bottom of the back leg.

To place the valve 90 in the disengaged position, the same procedure described with the valve 70 is performed, however with the third embodiment, the back leg 98 also grips the rolled seam 52 with its tooth 100 positioned under the rolled seam. In this disengaged position, the back end 96 of valve body 92 is raised above the fuel cell 12, so that a lower edge 97 of the valve body 92 defines an angle β relative to a plane defined by an upper end 84 of the fuel cell. As with the valve 70 in the disengaged position, the valve 90 is ready to be placed in the tool, and once in the tool, the back end 96 will be forced down by the door of the tool against the upper end 84 of the fuel cell 12, which places the valve 90 in the engaged position, establishing fluid communication between the fuel cell and the valve 90.

There is also a fourth embodiment of the present invention, seen in FIG. 8, wherein the valve is generally designated 110. The valve 110 is similar to the valve 90 except the valve 110 has a valve body 112 with a front end 114 and a back end 116, with the back end having a back leg 118 with an upper tooth 120, a lower tooth 122 and a groove 124 between them. The valve body 112 fits similarly onto the fuel cell 12 as does the valve 90, except that the back leg 118 is fitted to the rolled seam 52 with the upper tooth 120 located above the rolled seam and the lower tooth 122 located below the rolled seam. In operation, the valve 110 works identically to the valve 90.

Thus, it will be seen that the present valve 10, 70, 90, and 110 provides an improved external metering valve that can be engaged with the fuel cell 12 in the disengaged position without the shipping cap 6. Further, the present valve 10, 70, 90, and 110 is readily moved from the disengaged position to the engaged position making it simpler to use, less likely to cause damage to the tool, and overall, more user friendly.

While specific embodiments of the external metering valve for a fuel cell of the present invention have been shown and described, it will be appreciated by those skilled in the art that changes and modifications may be made thereto without departing from the invention in its broader aspects and as set forth in the following claims.

What is claimed is:

1. A method of using an external metering valve with a fuel cell for use in a combustion tool, comprising:

providing an external metering valve and a separate fuel cell;

providing said metering valve with an internal metering chamber which is sealed by a biased reciprocating valve stem until said stem is depressed to overcome said bias;

inserting the valve onto the fuel cell in a disengaged position for shipping and storing, where the valve has not established fluid communication with the fuel cell;

securing the combined valve and fuel cell into the combustion tool for use; and pressing the valve simultaneously with said securing, into an engaged position whereby the valve has established fluid communication with the fuel cell for filling said metering chamber with fuel.

2. The method of claim 1 further providing an external metering valve having a front end and a back end with the front end having at least one leg, and the at least one leg having a groove; and fitting the groove onto the fuel cell with the back end raised above the fuel cell in the disengaged position.

3. The method of claim 2 further providing the back end having a second leg, and the second leg having a tooth; and said method further including causing the tooth to grip the fuel cell, where the back end is raised above the fuel cell in the disengaged position.

4. The method of claim 3 further providing the second leg having two teeth; and said method further including causing the two teeth to grip the fuel cell, where the back end is raised above the fuel cell in the disengaged position.

5. A method of using an external metering valve with a fuel cell for use in a combustion tool, comprising:

providing an external metering valve and a separate fuel cell;

providing said metering valve with an internal metering chamber which is sealed by a biased reciprocating valve stem until said stem is depressed to overcome said bias;

inserting the valve onto the fuel cell in a disengaged position for shipping and storing;

pushing the valve into an engaged position in which fuel is transferred from said fuel cell into said metering chamber; and once in said engaged position, inserting the combined valve and fuel cell into the combustion tool for use;

whereby in the disengaged position, the valve has not established fluid communication with the fuel cell, and in the engaged position the valve has established fluid communication with the fuel cell for filling said metering chamber with fuel.

6. A method of using an external metering valve with a fuel cell for use in a combustion tool, comprising:

providing an external metering valve, where the valve has at least one leg having a first formation and a second formation, and a separate fuel cell;

providing said metering valve with an internal metering chamber which is sealed by a biased reciprocating valve stem until said stem is depressed to overcome said bias;

engaging the first formation with the fuel cell in a disengaged position for shipping and storing;

pushing the valve downward onto the fuel cell, engaging the second formation with the fuel cell in an engaged position; and once in said engaged position, placing the valve and fuel cell into the combustion tool for use;

whereby in the disengaged position, the valve has not established fluid communication with the fuel cell, and in the engaged position the valve has established fluid communication with the fuel cell for filling said metering chamber with fuel.

7. A valve configured for use with a fuel cell in both a disengaged position, in which the valve has not established fluid communication with the fuel cell, and an engaged position, in which the valve has established fluid communication with the fuel cell, said valve comprising:

a valve body having a first formation for maintaining the disengaged position, and a second formation for maintaining the engaged position; and a metering chamber in said valve body configured for receiving a determined quantity of fuel from the fuel cell in the engaged position, said metering chamber including a biased valve stem which seals said chamber until said stem is subjected to a force which overcomes said bias.

8. The valve of claim 7, further comprising:

said valve body having separate front and back legs, said legs being arcuate in cross-section when viewed from below; and said front and back legs each having said first formation and said second formation, said front leg has a thicker vertical cross-section relative to said back leg.

9. The valve of claim 7, further comprising:

said valve body having at least one leg; and said at least one leg having said first formation and said second formation.

10. The valve of claim 9, further comprising:

said first formation is a groove configured for holding said valve body in the disengaged position; and said second formation is a groove configured for holding said valve body in the engaged position.

11. The valve of claim 9, where said first formation is disposed below said second formation.

12. A valve configured for use with a fuel cell in both a disengaged position, in which the valve has not established fluid communication with the fuel cell, and an engaged position, in which the valve has established fluid communication with the fuel cell, said valve comprising:

a valve body having a front end having a biased valve stem projecting therefrom, said stem being in fluid communication with a metering chamber and a back end;

said front end having at least one separate leg, each said leg engaging only a portion of the fuel cell;

said at least one leg only at said front end being configured to be frictionally secured to a rolled seam of the fuel cell in the disengaged position; and in the disengaged position, said back end of said valve body is raised above said fuel cell, so that said body defines an angle relative to a plane defined by an upper end of the fuel cell.

13. The valve of claim 12, where said back end of said valve body is raised above said fuel cell in the disengaged position, and being movable into the engaged position when the fuel cell is operationally placed in a power tool and said valve body is pushed by a tool component into the engaged position.

14. The valve of claim 12, where said back end has a second leg having a tooth.

15. The valve of claim 12, where said back end has a second leg having two teeth.

16. A combined fuel cell and valve, comprising:

a cylindrical shell with a rolled seam at one end;

said rolled seam defining a generally circular space circumscribing a nozzle;

a valve body having a first formation engageable with said rolled seam for maintaining a disengaged position for preventing fluid communication between said nozzle and said valve body; and said valve body having a second formation engageable with said rolled seam for maintaining an engaged position for creating fluid communication between said nozzle and said valve body;

said valve body having separate front and back legs;

said front and back legs each having said first formation and said second formation; and said front leg has a thicker vertical cross-section relative to said back leg.

17. The combined fuel cell and valve of claim 16, further comprising:

said valve body having at least one leg; and said at least one leg having said first formation and said second formation.

18. The combined fuel cell and valve of claim 16, further comprising:

said first formation is a groove configured for holding said valve body in the disengaged position to said rolled seam; and said second formation is a groove configured for holding said valve body in the engaged position to said rolled seam.

19. The combined fuel cell and valve of claim 16, where said first formation is disposed below said second formation.

* * * * *